Patented Dec. 12, 1933

1,939,235

UNITED STATES PATENT OFFICE 1,939,235

PROCESS OF MAKING CELLULOSE ACETATE

Cyril J. Staud and Charles S. Webber, Rochester, N. Y., assignors to Eastman Kodak Company, Rochester, N. Y., a corporation of New York No Drawing. Application December 22, 1928
Serial No. 328,062

17 Claims. (Cl. 260—101)

This invention relates to processes of making cellulose acetate and particularly from cellulosic material that has heretofore been considered useless for producing cellulose acetates of high grade.

In the manufacture of cellulose acetate, it is customary to prepare in some manner the cellulosic material prior to subjecting it to the reagents of acetylation. It has generally been considered that cellulose that has been modified by oxidizing agents (often erroneously called "oxycellulose" in the literature) is unsuitable as starting material for the preparation of cellulose acetate of the best quality. It has seemed equally important to those skilled in this art not to use as raw material cotton linters or other cellulosic bodies having low cuprammonium viscosities or a high percentage of material soluble in potassium hydroxide of say a solubility of 27% or greater.

In general, cellulosic materials of high alkali solubilities have low alpha cellulose content and those of high cuprammonium viscosity have high alpha cellulose content.

The yield of cellulose acetate from all these materials was of such poor quality that every possible effort was made to guard against their use.

We have made the surprising discovery, on the other hand, that cellulose having the above characteristics can, by oxidation with acetic acid solutions of nitrogen dioxide, be rendered suitable for the production of cellulose acetate that will conform to the rigorous manufacturing standards of the photographic industry. It is apparent that this process is applicable to cellulosic materials having quite different, but hitherto undesirable characteristics.

In the preferred form of our invention which will hereinbelow be given, it will be understood that we will not be restricted by the proportions shown nor by the exact manner of carrying out the reactions except as indicated in the appended claims. Nitrogen oxide ($NO_2$) produced by the action of nitric acid on copper, or by any other suitable manner, is dissolved in acetic acid. This may be done at ordinary temperatures but we prefer to saturate the acetic acid at a temperature of 0° C. The nitrogen oxide polymerizes therein to form its dimer, $N_2O_4$, which imparts to the solution a blue-green coloration. Both of these oxides are designated by the same name, nitrogen tetroxide, since they are readily converted from one form to the other, and we use this term to designate the oxide in either form.

50 parts by weight of cotton linters are placed in an excess of acetic acid (say 500 parts) of 85–100% strength which has been saturated with the described nitrogen oxide. It is held therein until the blue coloration has almost entirely disappeared which generally requires from 10 to 20 hrs. the temperature being maintained at 20–30° C.; this treatment may be repeated if a very resistant material is being employed. The solution is filtered, dehydrated with acetic acid and acetylated by any suitable acetylation process; we prefer to employ the process disclosed in the pending application of H. LeB. Gray, filed December 17, 1927, Serial No. 240,943 now Patent 1,823,359, granted September 15, 1931. When glacial acetic acid solutions of nitrogen tetroxide are used, it is not necessary to go through the dehydration process and the material may be used directly with the residual oxide of nitrogen contained therein after being pressed until the ratio of liquid to the solid is that designated by the pending application cited above, i. e. 44 parts of acetic acid per 50 parts of cellulose.

As acetic acid is merely a carrier of the nitrogen tetroxide to the cellulose, any suitable solvent of the nitrogen oxide may be used, formic, acetic, propionic, butyric acids, etc., in fact any of the lower aliphatic acids are suitable. Because of the commercial availability of acetic acid, it, however, is at present preferred. The temperature of the reaction is not critical, although too high a temperature should not be employed unless greater than atmospheric pressure be exerted over the solution to hold the nitrogen tetroxide therein. At temperatures below those given in the example a greater time of reaction is, of course, required. The solubility of the material obtained by the procedure described in the above example, in 10% potassium hydroxide at 100° C. is in excess of 25% by weight for the 20 hours treatment and 15% for the 10 hours treatment.

Specifically, 44 parts of acetic acid may be left in the linters and acetylated in a bath of 115 parts of 95.8% acetic anhydride diluted to 350 parts with ethylene dichloride to which 2 parts of a mixed catalyst had been added. This mixed catalyst includes sulfuric and phosphoric acid, preferably in the proportions of one to three parts respectively.

The dopes produced from cellulose acetate prepared by the above process are of very high viscosity, and films produced therefrom have exceptional flexibility.

We have found that the results obtained by the acetylating method described are much more uniformly successful than by other methods when used upon materials pretreated with nitrogen tetroxide, and that the acetate obtained has superior qualities.

Having thus described our invention, what we claim as new and desire to secure by Letters Patent is:

1. A process of preparing cellulose fibers in order to facilitate esterification, consisting in subjecting the fibers to the action of a pretreatment bath containing a substantial amount of nitrogen tetroxide.

2. A process of preparing cellulose fibers in order to facilitate esterification, consisting in subjecting the fibers to the action of a solution of a lower aliphatic acid saturated with nitrogen tetroxide.

3. A process of preparing cellulose fibers in order to facilitate esterification, consisting in subjecting the fibers to the action of a solution of acetic acid saturated with nitrogen tetroxide.

4. A process of preparing cellulose fibers in order to facilitate esterification, consisting in subjecting the fibers to the action of a solution of acetic acid of 85 to 100% strength saturated with nitrogen tetroxide.

5. A process of preparing cellulose fibers in order to facilitate esterification, consisting in subjecting the fibers to the action of a solution of acetic acid into which nitrogen tetroxide has been absorbed to saturation.

6. The process of making cellulose acetate which comprises treating cellulose with a pretreatment bath containing a substantial amount nitrogen tetroxide and thereafter acetylating the treated material.

7. The process of making cellulose acetate which comprises treating cellulose with a saturated acetic acid solution of nitrogen tetroxide and thereafter acetylating the treated material in an acetylating bath containing acetic anhydride and phosphoric acid.

8. The process of making cellulose acetate which comprises treating cellulose with a saturated acetic acid solution of nitrogen tetroxide for 10 to 20 hours and thereafter acetylating the treated material in an acetylating bath containing acetic anhydride and a mixed catalyst of sulfuric and phosphoric acids.

9. Cellulose that has been subjected to oxidation by a nitrogen tetroxide saturated solution of a lower aliphatic acid whereby the cellulose has been rendered more susceptible to acetylation.

10. Cellulose that has been subjected to oxidation by a nitrogen tetroxide saturated solution in acetic acid whereby the cellulose has been rendered more susceptible to esterification.

11. A process of preparing cellulose fibers in order to facilitate esterification, consisting in subjecting the fibers to the action of a solution of acetic acid saturated with nitrogen tetroxide, said action being conducted at a temperature of 20–30° C.

12. A process of preparing cellulose fibers in order to facilitate esterification, consisting in saturating an acetic acid solution with nitrogen tetroxide at a temperature of approximately 0° C., and subjecting said cellulosic fibers to the action of this solution at a temperature of 20–30° C. and acetylating the resulting material.

13. A process of preparing cellulose fibers in order to facilitate esterification, consisting in subjecting the cellulose to the action of a pretreatment bath containing a substantial amount of nitrogen tetroxide until the alkali solubility thereof has attained at least 15%.

14. In the process of making a cellulose ester of a fatty acid, the step comprising treating cellulose, prior to acylation in the presence of nitrogen tetroxide.

15. In the process of making cellulose acetate, the step which comprises treating the cellulose in the presence of nitrogen tetroxide prior to the acetylation of the cellulose.

16. Cellulose, which has been subjected to the action of a pretreatment bath containing a substantial amount of $NO_2$ or its dimer whereby it has been rendered more susceptible to esterification.

17. Cellulose, the alkali solubility of which has been decreased by treatment with a pretreatment bath containing a substantial amount of $NO_2$ or its dimer.

CYRIL J. STAUD.
CHARLES S. WEBBER.

CERTIFICATE OF CORRECTION.

Patent No. 1,939,235.  December 12, 1933.

CYRIL J. STAUD, ET AL.

It is hereby certified that error appears in the printed specification of the adove numbered patent requiring correction as follows: Page 2, line 36, claim 6, before "nitrogen" insert the word of; lines 115 and 121, claims 16 and 17, respectively, for "dinier" read dimer; and that the said Letters Patent should be read with these corrections therein that the same may conform to the record of the case in the Patent Office.

Signed and sealed this 6th day of February, A. D. 1934.

F. M. Hopkins (Seal)  Acting Commissioner of Patents.